United States Patent [19]

Ohara

[11] Patent Number: 5,589,686
[45] Date of Patent: Dec. 31, 1996

[54] METHOD OF AN APPARATUS FOR REAL-TIME NANOMETER-SCALE POSITION MEASUREMENT OF THE SENSOR OF A SCANNING TUNNELING MICROSCOPE OR OTHER SENSOR SCANNING ATOMIC OR OTHER UNDULATING SURFACES

[76] Inventor: Tetsuo Ohara, 12 Lindall Pl., #4, Boston, Mass. 02114

[21] Appl. No.: 588,651

[22] Filed: Jan. 19, 1996

Related U.S. Application Data

[63] Continuation of Ser. No. 216,057, Mar. 22, 1994, abandoned.

[51] Int. Cl.$^6$ .............................. G01B 5/28; H01J 37/26
[52] U.S. Cl. .............................. 250/306; 250/307
[58] Field of Search ...................... 250/306, 307, 250/423 F; 73/105

[56] References Cited

U.S. PATENT DOCUMENTS

| | | | |
|---|---|---|---|
| Re. 33,387 | 10/1990 | Binnig ..................................... | 250/306 |
| 4,343,993 | 8/1982 | Binnig et al. ........................... | 250/306 |
| 4,823,004 | 4/1989 | Kaiser et al. ........................... | 250/307 |
| 5,085,070 | 2/1992 | Miller et al. ............................ | 73/105 |
| 5,406,833 | 4/1995 | Gamble et al. ......................... | 250/307 |
| 5,507,179 | 4/1996 | Gamble et al. ......................... | 250/306 |

*Primary Examiner*—Bruce C. Anderson
*Attorney, Agent, or Firm*—Rines & Rines

[57] ABSTRACT

A method of and apparatus for producing real-time continual nanometer scale positioning data of the location of sensing probe used with one of a scanning tunneling microscope, an atomic force microscope, or a capacitive or magnetic field-sensing system, for measuring the probe distance and the position relative to an atomic surface or other periodically undulating surface such as a grating or the like moving relatively with respect to the probe, and between which and the surface there exists a sensing field, through rapid oscillating of the probe under the control of sinusoidal voltages, and comparison of the phase and amplitude of the output sinusoidal voltages produced by current in the sensing field to provide positional signals indicative of the direction and distance off the apex of the nearest atom or undulation of the surface; and, where desired, feeding back such positional signals to control the relative movement of the probe and surface.

20 Claims, 12 Drawing Sheets

METHOD OF AN APPARATUS FOR REAL-TIME NANOMETER-SCALE POSITION MEASUREMENT OF THE SENSOR OF A SCANNING TUNNELING MICROSCOPE OR OTHER SENSOR SCANNING ATOMIC OR OTHER UNDULATING SURFACES

This is a file wrapper continuation of parent application Ser. No. 08/216,057, filed Mar. 22, 1994 abandoned.

The present invention relates to nanometer and other inter-atomic measurements, as with scanning tunneling microscopes (STM), atomic force microscopes (AFM), and other suitable scanning sensors, being particularly concerned with sub-atomic dimension measurements of scanner or sensor position over an undulating atomic or other undulating surface, such as an undulating holographic grating, conventional diamond-cut or other-formed gratings, and surfaces of undulating fields—magnetic and electric—including also the feeding back of such real time nanometer positional measurements for surface control.

BACKGROUND OF INVENTION

Laser interferometry is currently widely used for fine measurements of a few hundredths of a light wavelength resolution in the manufacture or processing of high precision surfaces or tools, such as mirrors and lenses and the like, integrated circuit wafers, such as memory chips, and similar devices. In the manufacture of wafers and the like, for example, it is desired to proceed in the processing along parallel lines of a few sub-microns width, and it is important to know the position at all times and to ensure that the processing is taking place exactly along these lines within a few percent. Today, the tracking of position in such scanning processes as in the manufacture of wafers and the like, is effected through laser interferometry. Laser interferometers, however, are designed for one-axis measurement and require very expensive and stable laser sources, and optics. In order to get down to the order of nanometer resolution, this has to be divided into several hundred units. This subjects the system to inaccuracies since the wavelength of the laser may vary as a result of temperature variations, airflow condition changes, and so forth. Often, moreover, it is required that such high precision measurements be done in a vacuum which is expensive and cumbersome.

Other applications where very good precision is required are, for example, in the manufacture of master disks for CD-disk reproduction and the like. In the diamond machining and finishing of satellite telescopes and the like, similar orders of precision are required as well.

Particularly since the advent of scanning tunneling microscopes, described for example by G. Binnig and H. Rohrer in Helev. Phys. Acta, 55, 726 (1982), and atomic force type microscopes, as in U.S. Pat. No. 4,724,318, the imaging of atomic surfaces and the like has become readily feasible, opening the door to nanometer position resolution.

In publications by Higuchi and others, such as in "Crystalline Lattice for Metrology and Positioning Control", Proceedings IEEE Micro Electro Mecahnical Systems, page 239–244, such equipment has therefore been used with an atomic surface disposed on a moving table, wherein the tunneling microscope sensor counts the number of atoms on the passing surface in the X and/or Y direction to come to different predetermined positions or locations on the surface. To effect position locking for each new position attained, the table is rotated, always being in sinusoidal vibration.

This operation, however, does not give real-time continual sensor position location measurements over the surface; and it is to the provision of such continual locations measurement that the invention is directed, and at resolutions of the order of 0.01 nanometers and below—namely one tenth to one hundredth of the resolution of laser interferometric position measurements. The invention, furthermore, unlike Higuchi, et al, obviates the table vibration position locking and provides for position locations by sensor oscillation about a reference point. The advantages over laser interferometry, in addition to the greatly improved resolution, reside also in the obviating of the need for an optical system, its complexity and its errors due to temperature variations and the like.

OBJECTS OF INVENTION

It is accordingly an object of the present invention to provide a new and improved method of and apparatus for nanometer scale real-time sensor position measurement (and control) on atomic surfaces, void of the prior art problems above discussed, and particularly useful with scanning tunneling microscopes, and atomic force microscopes and the like.

A further object is to provide such a novel method that is also adapted to position measurement on other physically undulating or periodic alternating peak surfaces than atomic surfaces, such as gratings and the like, and also surfaces having magnetic and electric alternating regions as well.

Other and further objects will be explained hereinafter and are more particularly pointed out in connection with the appended claims.

SUMMARY

In summary, however, the invention embraces a method of real-time nanometer scale position location measurement of a probe scanning a periodically undulating surface as the surface and probe are relatively moved, that comprises, setting up a sensing field between the probe and the surface; oscillating the probe during said scanning about a reference origin point of the probe by a controlling sinusoidal voltage; measuring the output sinusoidal voltage generated by the sensing field during said oscillation and after passing through the surface; comparing the phase and amplitude of the controlling and output voltages; and developing from such comparing, positional signals, on a continual basis, indicative of the direction and distance of the probe off the apex of the nearest undulation of the surface, and thus the position of the probe along the surface.

Preferred and best mode designs and details will later be explained.

DRAWINGS

The invention will now be described with reference to the accompanying drawings, FIG. 1 of which is a combined isometric view of a scanning tunneling microscope sensor and detecting circuit and an atomic surface relatively moving past one another;

DESCRIPTION OF PREFERRED EMBODIMENT(S)

Figure 1:
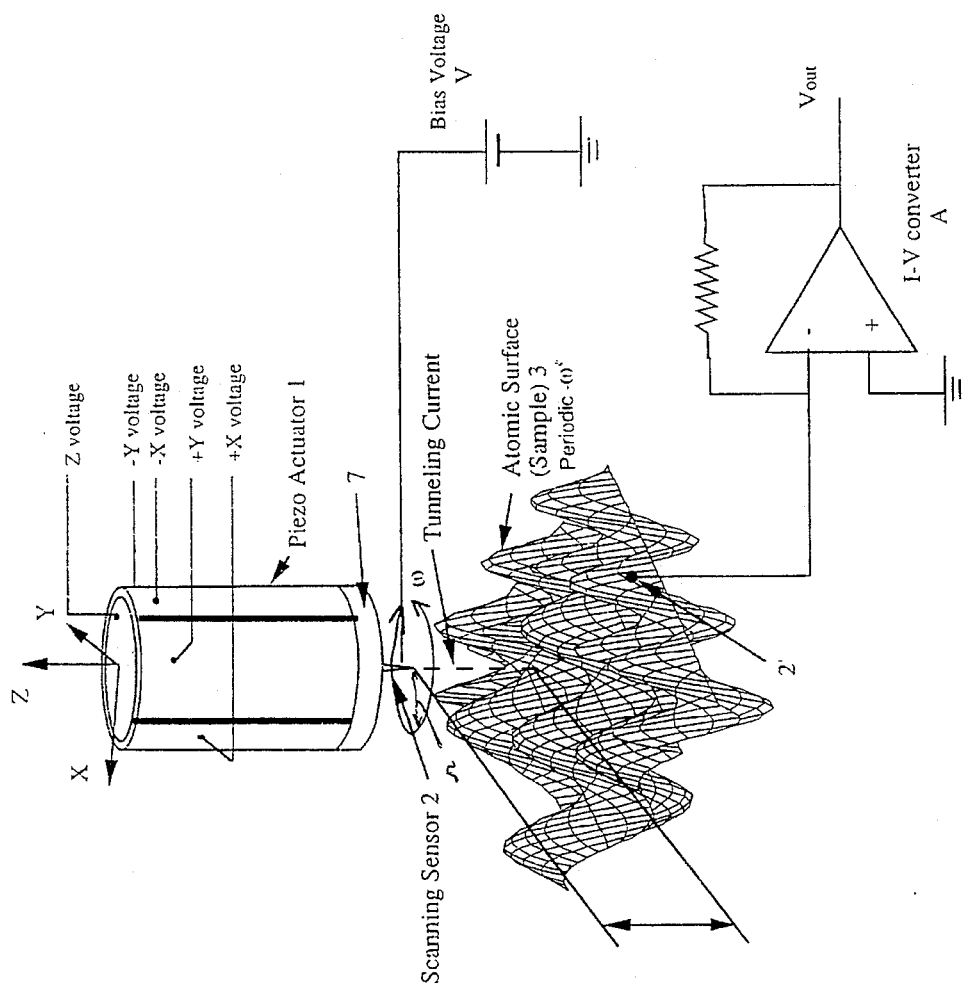
Figure 4:
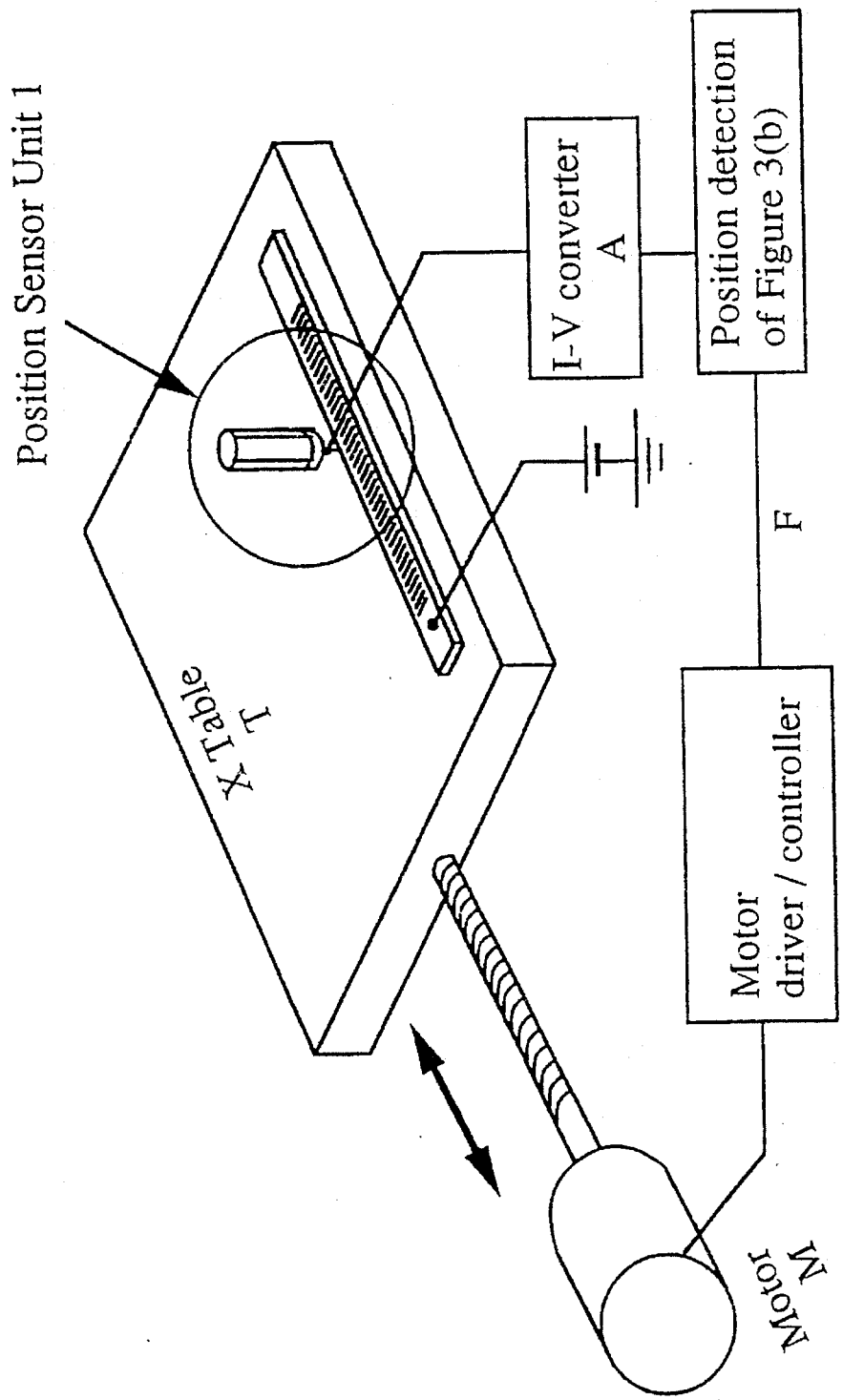
FIG. 4 is an application using the invention as a position sensor the X table control.
Figure 9:
FIG. 9 is an STM reproduction of a graphite sample used to test the invention.

A preferred apparatus, illustrated as used with a scanning tunneling microscope (STM), is shown in FIG. 1, operating in accordance with the principles of the invention. A scanning sensor probe 2 as of pointed tungsten or Pt-Ir wire or the like, is shown operating in the STM mode over a conducting undulating atomic surface sample 3, positioned, for example, on a table or surface T, FIG. 4. When the sensor tip is positioned several nanometers above the sample surface 3, a tunneling current is generated by the bias voltage V applied between the sensor tip and electrode 2' at the bottom of the surface sample. The tunneling current is applied to an I-V converter A, resulting in an output voltage Vout, which is a function of the distance between the sensor probe 2 and the atoms of the surface 3. By scanning the probe 2 in the X,Y directions over the sample surface, the topographic information of the surface is obtained and an image of the atomic surface is thereby reconstructed (FIG. 9).

Figure 3A:
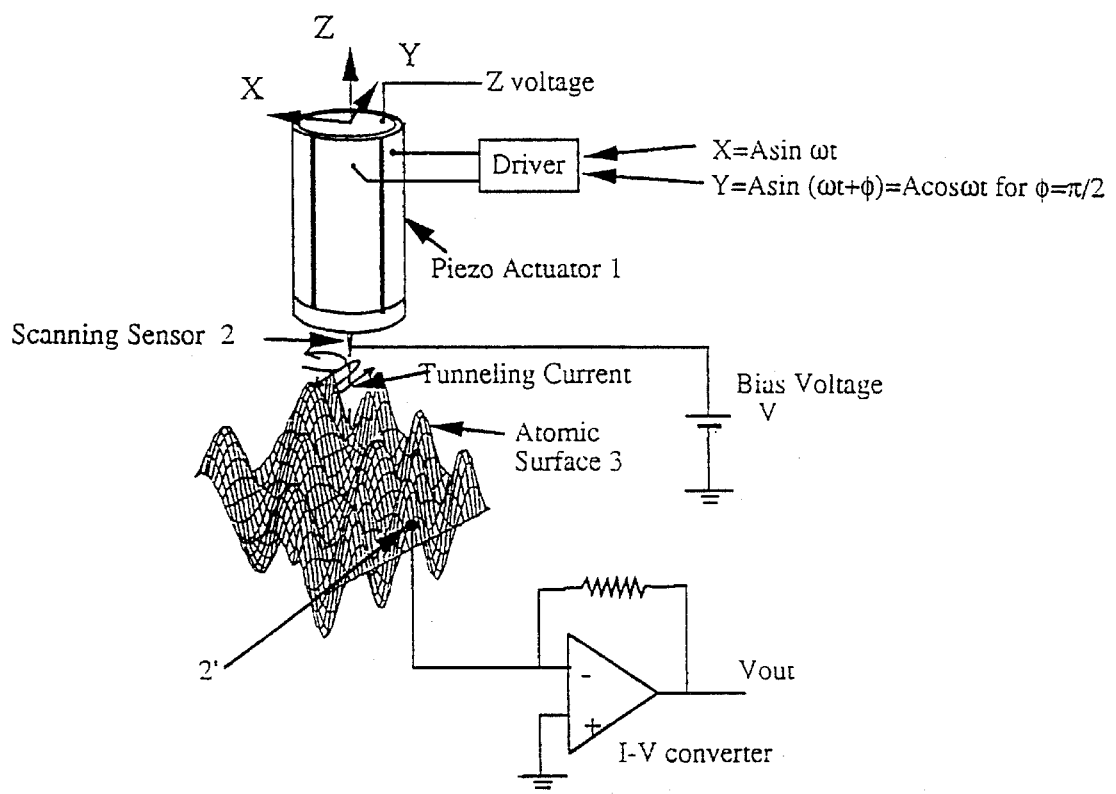
FIG. 3a is a combined isometric view of this invention which uses STM for schematic position measurement, with the graph illustrating the output from the I-V converter, X control signal, and Y control signal.
Figure 3A:
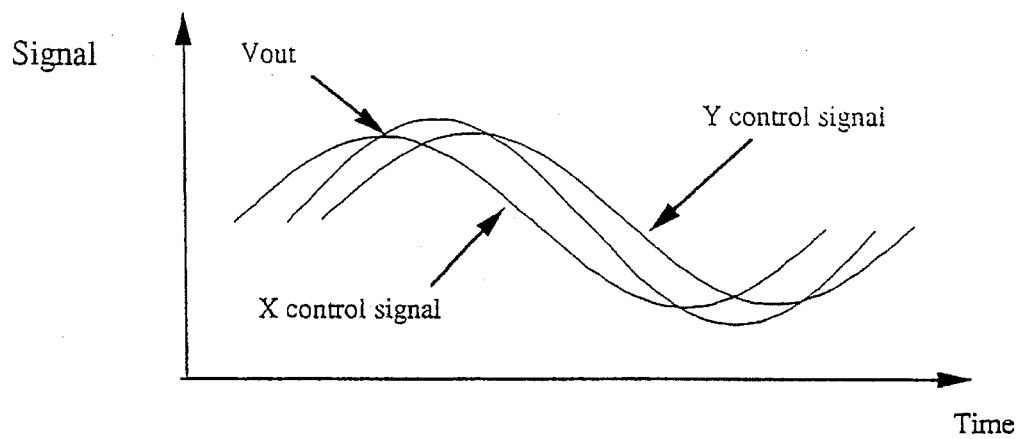

In accordance with the invention, the sensor probe 2 is oscillated substantially circularly or linearly, more particularly shown in FIG. 3a, about a reference origin point, by an oscillating piezoelectric actuator cylinder 1 to which it is mechanically though insulatingly connected; in turn driven by X and Y applied control sinusoidal voltages. As shown, there is a pair of X-direction electrodes for the piezoelectric (sine voltage—$A\sin \omega t$), a pair for the Y-direction (cosine voltage—$A\sin(\omega t+\phi)$, where $\phi$ is $\pi/2$), and a Z top electrode for height adjustment to the desired several nanometer distance required for generating tunneling current.

The output voltage Vout is thus sinusoidal, also, but not in phase with, nor of the same amplitude as that of the piezoelectric actuator control signals, as indicated in the waveform graph of FIG. 3a. By comparing the phase and amplitude of Vout with that of the controlling voltage driving the peizoelectric oscillator, the position of the probe—its reference point direction from, and distance off the apex of the nearest atom—can be obtained, and thus the position of the probe along the surface, encoded and indicated.

Figure 3B:
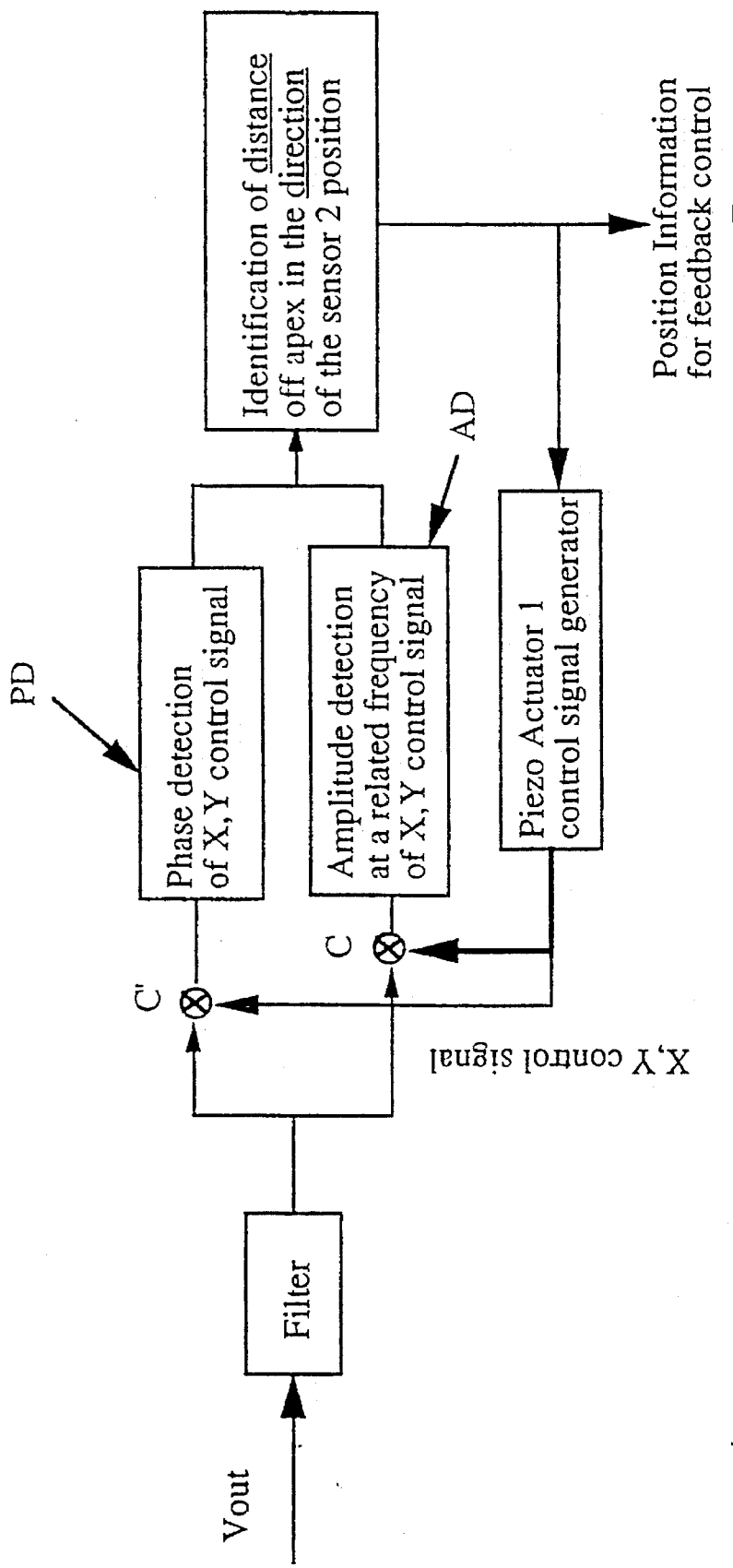
FIG. 3b shows the position measurement calculation flow using the invention.
Figure 10A:
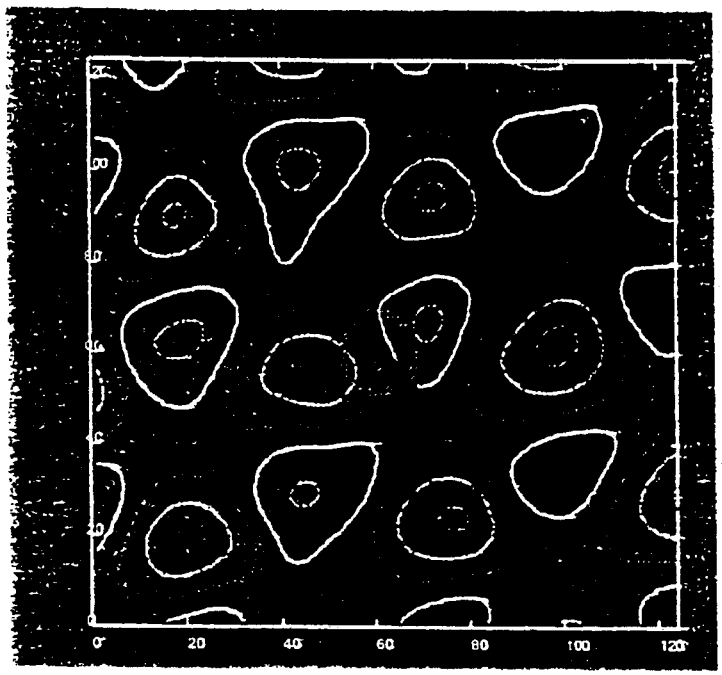
FIGS. 10a and 10b are computer simulations using real atomic surface data of the probe scans and resulting tunneling current output.
Figure 10B:
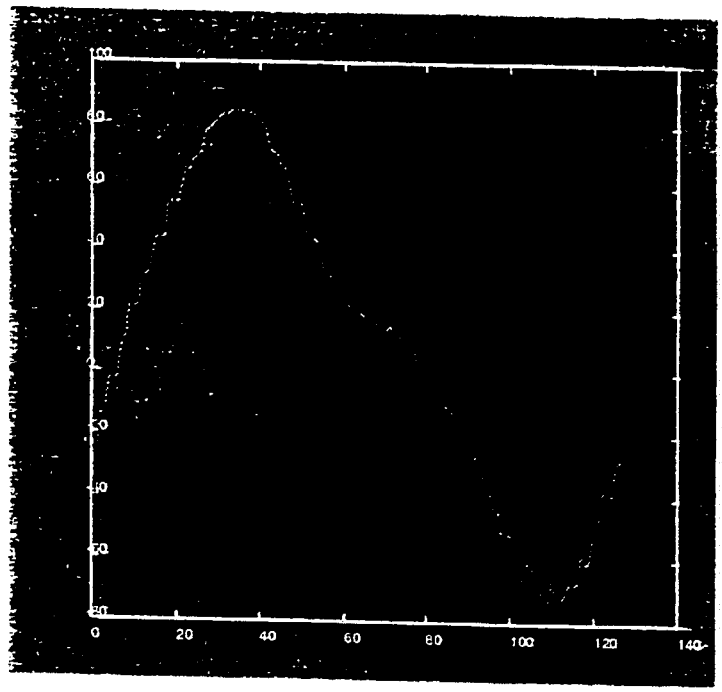

In FIG. 3b, comparisons of the amplitude and the phase of the control and output voltage sinusoidal signals of related frequency are effected at the multipliers C and C', respectively. After passing through the respective phase detection at PD and amplitude detection at AD (preferably though not essentially of an AM demodulation type, as described, for example, in Modulation Theory, Harold S. Black, D. Van Nostrand Co., 1953, page 141 on; and in The Art of Electronics, Paul Horowitz and Winfield Hill, Cambridge University Press, 1993, page 1031.), the probe positional information signals are generated, as mathematically demonstrated in my paper "Real-time subnanometer position sensing with long measurement range", IEEE International Conference on Robotics and Automation Proceedings, 1995. These may be indicated, recorded, and/or used as by feedback F, FIG. 4, for control purposes, such as motor-controlling the table T carrying the sample 3. Where the movement of the table is at a fast rate, Doppler or similar frequency variations may occur in Vout as compared to the frequency of the piezo driving voltages, but these can readily be compensated for by motion-sensing feedback, as is well known. FIG. 9 is an STM-topographical image of the atoms of a highly-oriented pyrolitic graphite (HOPG) surface of Union Carbide Grade B graphite, 1.2×1.2 nanometers in size, that I produced using a Pt-Ir wire probe tip 2 adjusted in the range 1–2 nanometers above the atomic surface 3, scanning over the sample in about 1 second. I applied 200 Hz sinusoidal control voltages to a one-half inch long by one-quarter of an inch diameter piezoelectric cylinder, manufactured by Matlock Company, to which the probe 2 was epoxy-secured, with an insulating ceramic disc 7 interposed to insulate the probe from the X and Y piezoelectric sinusoidal control signals of FIG. 1. In the computer readout of FIG. 10a, the graphite atoms are shown in contour, as the small circles, surrounded by concentric circles or near-circles that represent the rotary oscillation of the probe tip 2 under the control of the control signals X and Y. The resulting corresponding (though different phase and amplitude) tunneling current produced for one scan (after high-pass filtering) is shown in FIG. 10b, generated by the probe oscillation.

Figure 2:
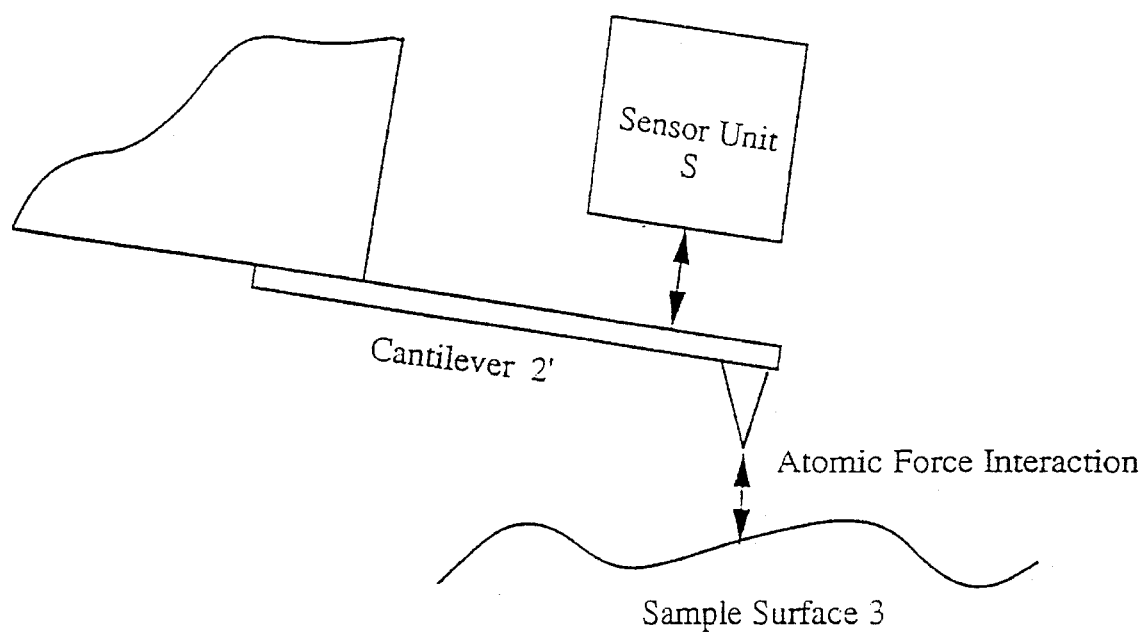
FIG. 2 is a simple schematic view of an atomic force microscope sensor for the invention.

As before stated, the probe 2 may also be replaced by a cantilever atomic force interaction field type sensor S, FIG. 2, of an AFM, as, for example, of the type described in the previously cited patent.

Figure 5:
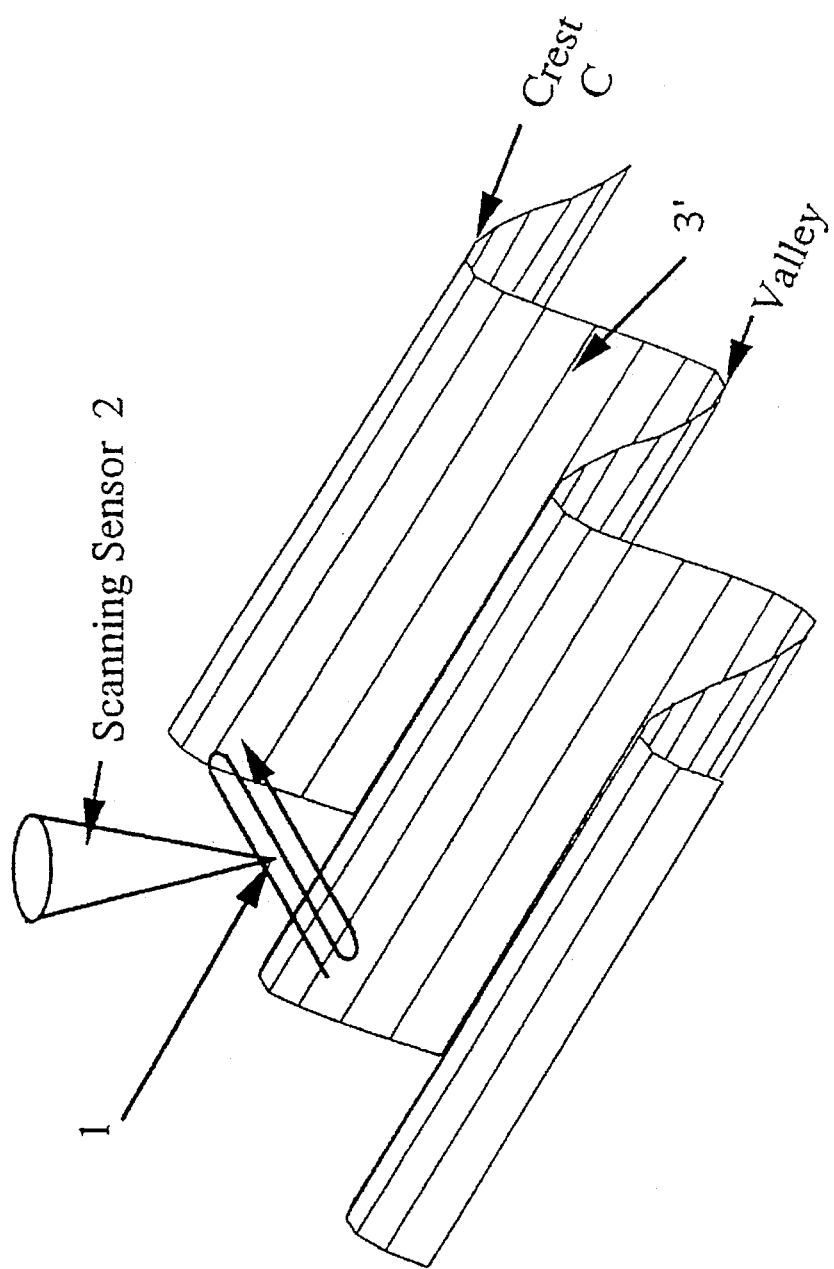
FIG. 5 is a schematic view of the invention with holographic grating and linear scanning sensor movement to obtain one-dimensional position information.

It has also been earlier pointed out that other physically undulating surfaces than an atomic surface may also be scanned, using the nanometer sensor position location technique of the invention, such as the conductive-coated holographic grating 3' of FIG. 5—shown for one-dimensional scanning. Clearly the technique may also be used with other undulating gratings or rulings or surfaces and the like, as well.

Figure 8:
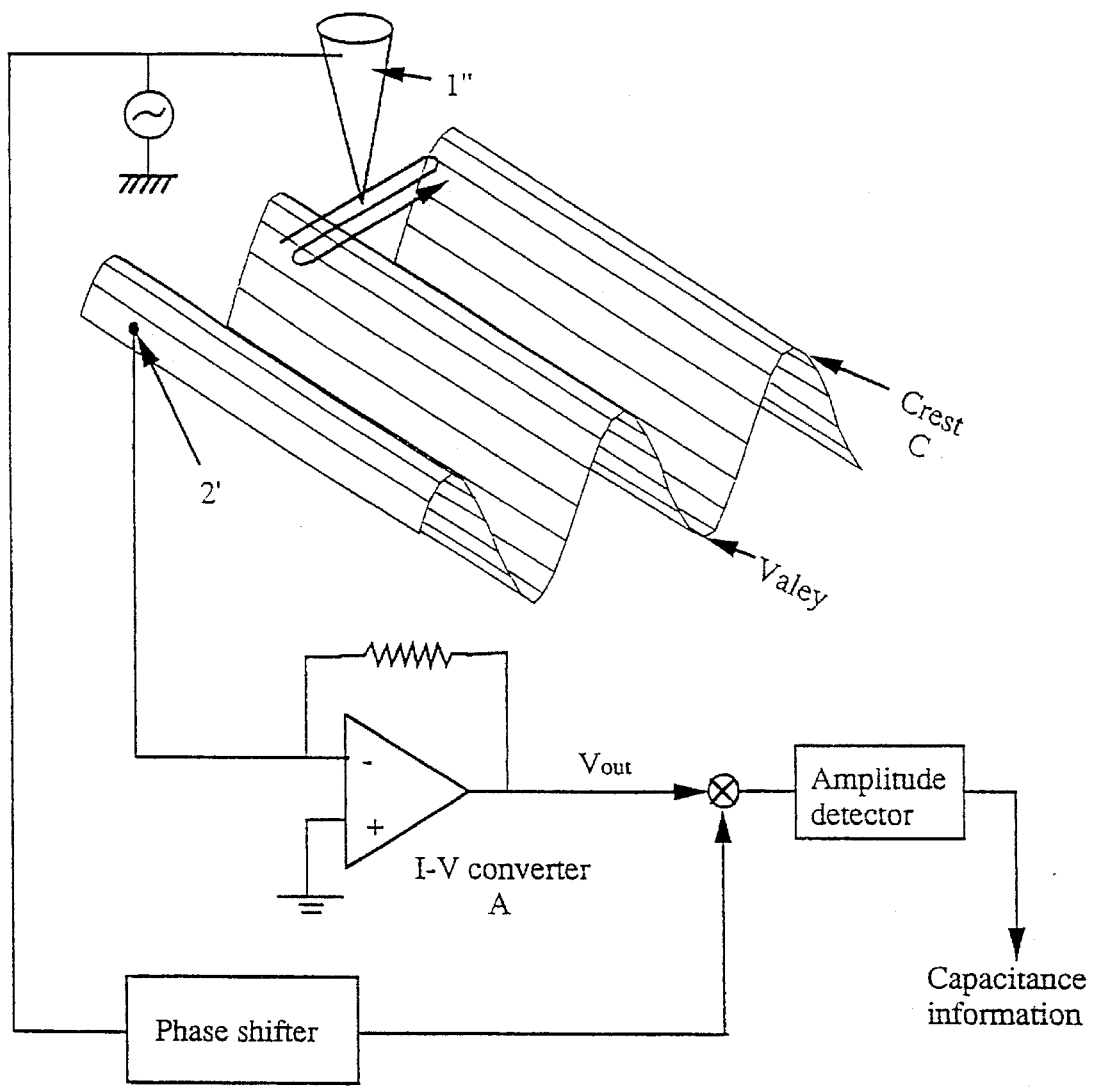
FIG. 8 is a similar view of capacitive sensing of a physically undulating grating.

The sensor probe may also be capacitive as in FIG. 8, shown using pointed electrode cooperating capacitively with the surface electrode 2' and linearly oscillated in this case over a grating 3 coated with conductive material.

Figure 6:
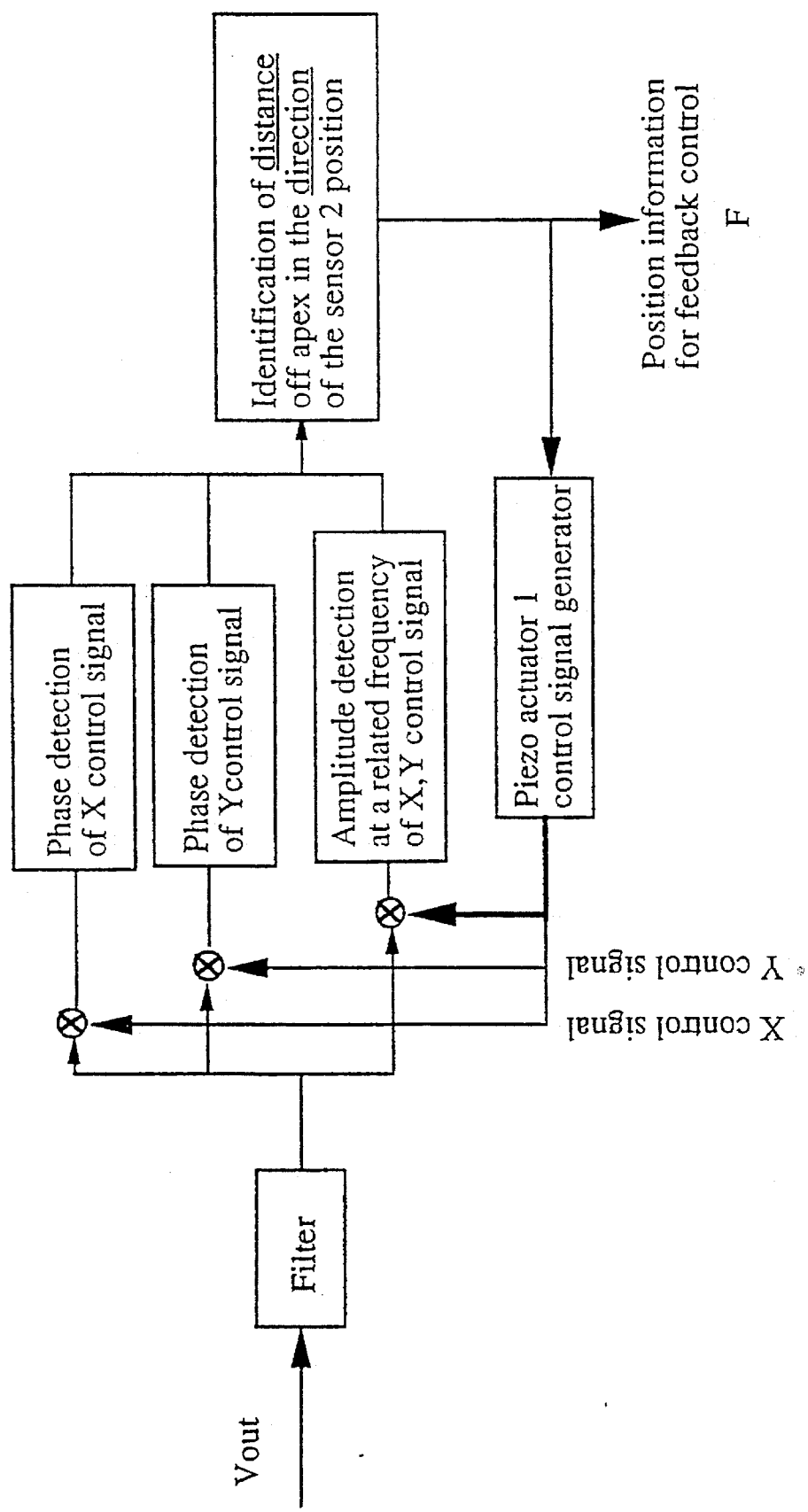
FIG. 6 is an example of two-dimensional position measurement calculation flow using the invention.

The invention, of course, is not limited in the embodiments of FIGS. 1–5 to one dimensional position location. FIG. 6 shows the derivation of two-dimensional position signals in the manner of FIG. 3, but for both X and Y components of the control and output voltage.

Figure 7:
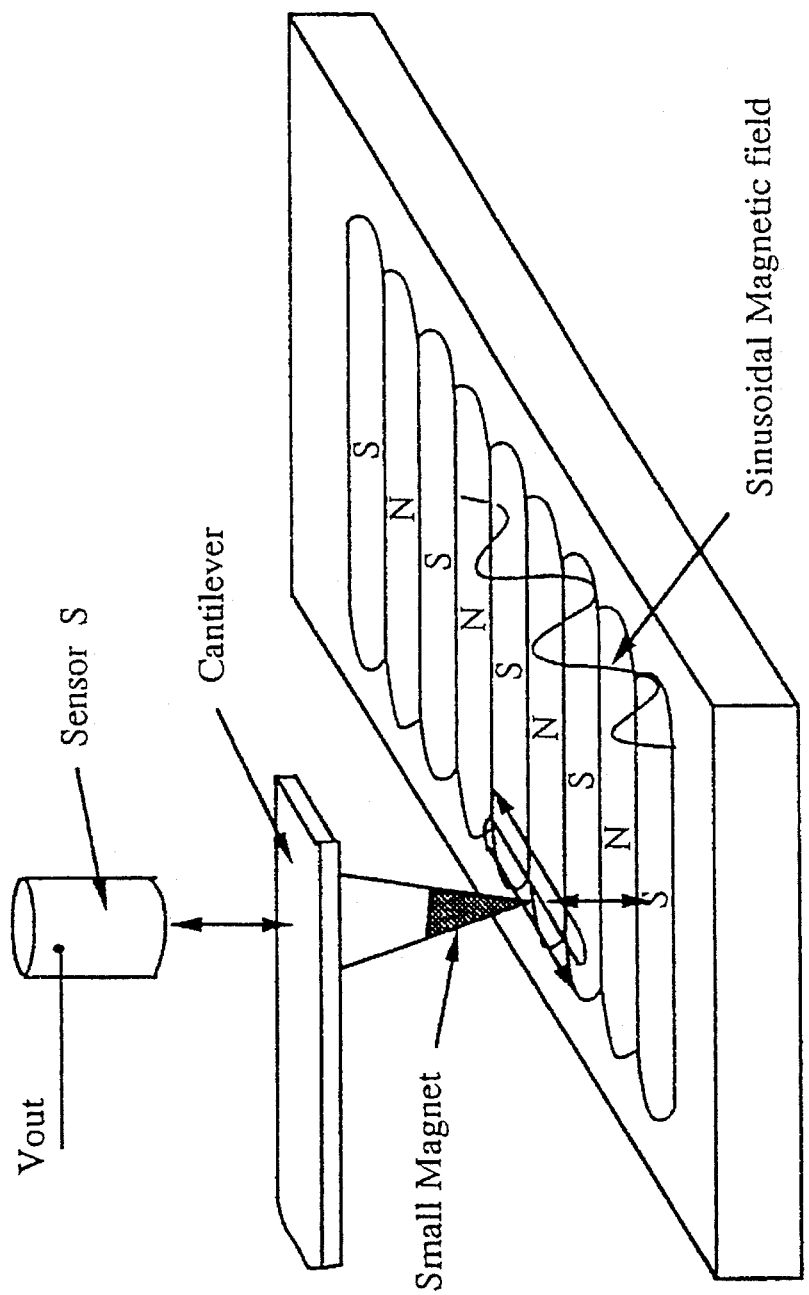
FIGS. 7a and 7b are the modifications for use of the invention with magnetic and electric undulating or alternating surface fields.
Figure 7:
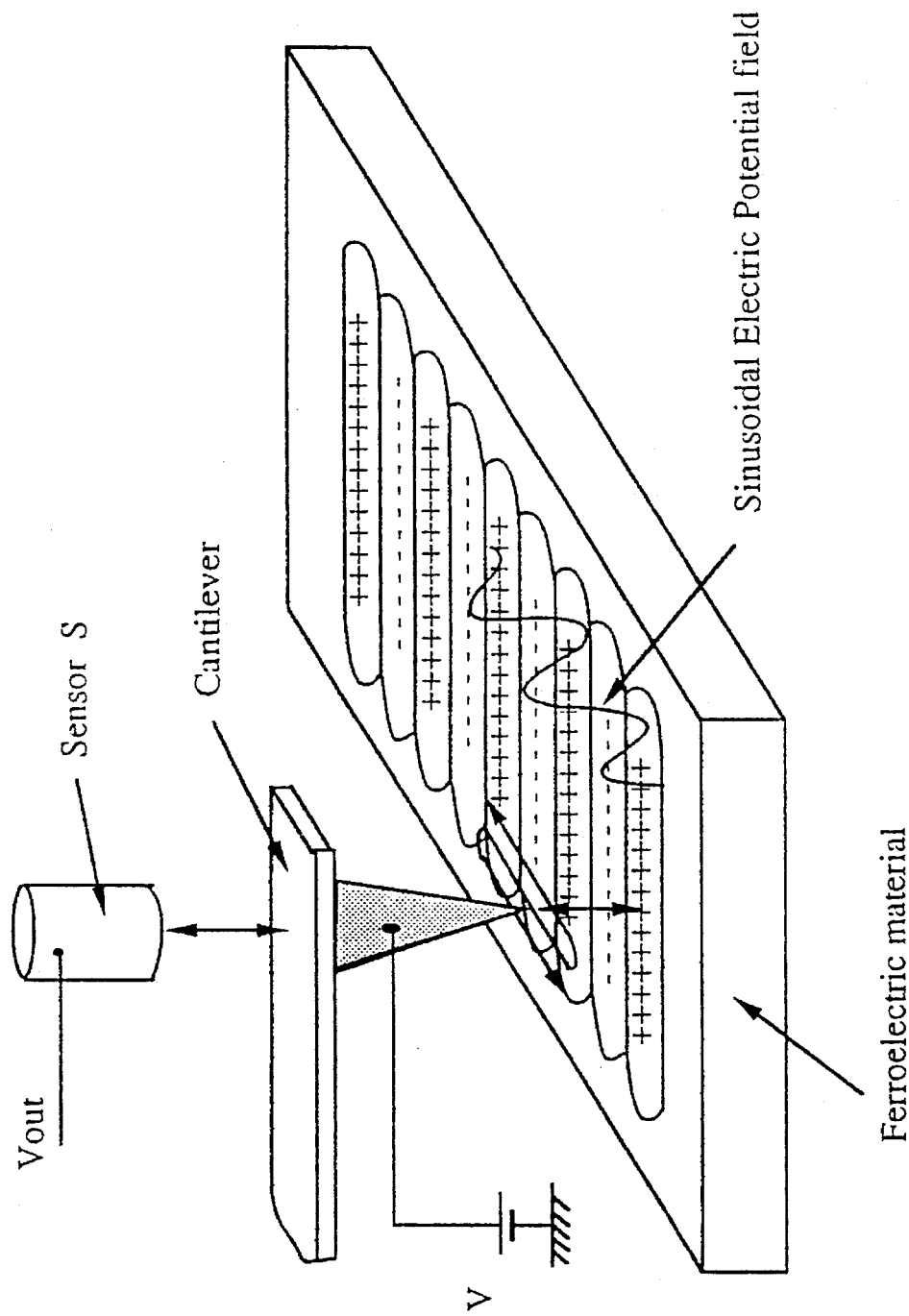

As earlier stated, moreover, the undulations or periodic alternating crests or peaks and valleys of a surface-to-be-scanned need not only be physical undulations, but the surface may contain periodic magnetic or electric undulations or crests and valleys as well. In FIG. 7a, periodic magnetic undulations are shown generating an undulating magnetic field by successive north (N) and south (S) opposite polarity surface regions, with a magnetic sensor being linearly oscillated and a sinusoidal output voltage being produced by magnetic interaction with the magnetic undulations provided on the surface. The analogous electrical undulations are shown provided in FIG. 7b by oppositely-charged ferroelectric or other successive regions on the surface, and using, as an example, cantilever-type electrical-force sensing.

Further modifications will occur to those skilled in this art, and such are considered to fall within the spirit and scope of the invention as defined in the appended claims.

What is claimed is:

1. A method of real-time nanometer scale position location measurement of a probe scanning a periodically undulating surface as the surface and probe are relatively moved, that comprises, setting up a sensing field between the probe and the surface: oscillating the probe during said scanning about a reference origin point of the probe by a controlling sinusoidal voltage; measuring the output sinusoidal voltage generated by the sensing field during said oscillation and after passing to the surface; comparing the phase and/or amplitude of the controlling and output voltages by multiplying said output sinusoidal voltage by said controlling sinusoidal voltage; and developing from such comparing, positional signals, on a continual basis, indicative of the direction and distance of the probe off the apex of the nearest undulation of the surface, and thus the position of the probe along the surface.

2. A method as claimed in claim 1 and in which the periodically undulating surface is a layer of successive atoms of a structure and in which said apex of the nearest undulation is the apex of the nearest atom on the surface.

3. A method as claimed in claim 2 and in which the scanning probe comprises the sensor probe in a tunneling microscope and the sensing field gives rise to a tunneling current between the probe and the atoms of the surface, and the output sinusoidal voltage is generated by said tunneling current after passing to the atoms of the surface.

4. A method as claimed in claim 2 and in which the scanning probe comprises a cantilever force sensor of an atomic force microscope and the sensing field gives rise to atomic force field signals generated between the probe and the atoms of the surface, and the output sinusoidal voltage is generated in response to currents resulting from said signals.

5. A method as claimed in claim 1 and in which the scanning probe comprises a capacitive sensor, and the sensing field gives rise to current between the probe and the surface, and the output sinusoidal voltage is generated by said current after passing to the surface.

6. A method as claimed in claim 1 and in which the surface undulations comprise one of magnetic and electric undulation alternate-polarity periodic peaks and the scanning probe comprises a corresponding one of a magnetic and electric sensor with a sensing field giving rise to a current between the probe and the surface, and the output sinusoidal voltage being generated by said current after passing to the surface.

7. A method as claimed in claim 1 and in which the periodically undulating surface comprises a sinusoidally undulating grating.

8. A method of real-time nanometer scale position measurement of a tunneling microscope sensor probe tracking an atomic surface as the surface and probe are relatively moved, that comprises, setting up a tunneling current between the probe and the atoms of the surface; oscillating the probe during said tracking about a reference original point of the probe by a controlling sinusoidal voltage; measuring the output sinusoidal voltage generated by the tunneling current during said oscillation and after passing through atoms of the surface; comparing the phase and/or amplitude of the controlling and output voltages by multiplying said output sinusoidal voltage by said controlling sinusoidal voltage; and developing from such comparing, positional signals, on a continual basis, indicative of the direction and distance of the probe off the apex of the nearest atom of the surface, and thus the position of the probe along the surface.

9. A method as claimed in claim 8 and in which the further step is effected of feeding back said positional signals to control the relative movement of the probe and surface.

10. A method as claimed in claim 9 and in which the surface is moved past the probe and the feeding back controls such moving.

11. A method a claimed in claim 8 and in which the controlling sinusoidal voltage has sine and cosine components and the phase and amplitude comparing is effected separately with each component to provide two-dimensional position measurements.

12. A method as claimed in claim 8 and in which the oscillating of the probe is effected in one of substantially rotary and linear oscillating motions.

13. Apparatus for real-time nanometer position measurement of a sensor probe scanning a periodically undulating surface as the surface and the probe are relatively moved, having, in combination with said probe, means for setting up a current between the probe and the surface; means operable during said scanning for oscillating the probe about a reference origin point of the probe by a controlling sinusoidal voltage; means for measuring the output sinusoidal voltage generated by the current during said oscillating and after passing to the surface; means for comparing the phase and/or amplitude of the controlling and output voltages by means for multiplying said output sinusoidal voltage by said controlling sinusoidal voltage; and means for developing from such comparing, positional signals on a continual basis, indicative of the direction and distance of the probe off the apex of the nearest atom or undulation of the surface, and thus the position of the probe along the surface.

14. Apparatus as claimed in claim 13 and in which means is provided for feeding back said positional signals to control the relative movement of the probe and surface.

15. Apparatus as claimed in claim 14 and in which said surface is disposed on a table and the feedback means controls the movement of the table.

16. Apparatus as claimed in claim 14 and in which said oscillating means comprises piezoelectric means connected to the sensor probe.

17. Apparatus as claimed in claim 13 and in which the oscillating means operates in one of substantially circular motion about said reference point and substantially linear oscillating motion.

18. Apparatus as claimed in claim 17 and in which said oscillating means is operated at a fast rate compared with the relative movement of the surface and the probe.

19. Apparatus as claimed in claim 13 and in which the sensor is one of a tunneling microscope, an atomic force microscope, and a capacitive and a magnetic probe-to-surface field sensing means.

20. A method of real-time nanometer scale position location measurement along a surface having one of successive periodically undulating alternate physical, electrical or magnetic peaks and valleys, of a probe scanning the surface as the probe and surface are relatively moved, that comprises, setting up a sensing field between a probe appropriate for one of respective physical, electrical or magnetic sensing and the surface; oscillating the probe during said scanning about a reference origin point of the probe by a controlling sinusoidal voltage; measuring the output sinusoidal voltage generated by the sensing field during said oscillation and after passing to the surface; comparing the phase and/or amplitude of the controlling and output voltages by multiplying said output sinusoidal voltage by said controlling sinusoidal voltage; and developing from such comparing, positional signals, on a continual basis, indicative of the direction and distance of the probe off the nearest peak of the surface, and thus the position of the probe along the surface.

* * * * *